(12) United States Patent
Kim et al.

(10) Patent No.: US 10,515,500 B2
(45) Date of Patent: Dec. 24, 2019

(54) CARD-TYPE SMART KEY AND MANUFACTURING METHOD THEREFOR

(71) Applicant: ALPS ELECTRIC KOREA CO., LTD., Gwangju (KR)

(72) Inventors: Ha Gyuen Kim, Gwangju (KR); Kyung Sim Jang, Gwangju (KR); Hyeong Joong Na, Gwangju (KR); Seong Jun Park, Gwangju (KR); Jeong Ju Yoon, Gwangju (KR); Dae Ho Kim, Gwangju (KR)

(73) Assignee: ALPS ELECTRIC KOREA CO., LTD., Gwangju (KR)

( * ) Notice: Subject to any disclaimer, the term of this patent is extended or adjusted under 35 U.S.C. 154(b) by 76 days.

(21) Appl. No.: 15/577,886

(22) PCT Filed: Jun. 1, 2016

(86) PCT No.: PCT/KR2016/005795
§ 371 (c)(1),
(2) Date: Nov. 29, 2017

(87) PCT Pub. No.: WO2016/195373
PCT Pub. Date: Dec. 8, 2016

(65) Prior Publication Data
US 2018/0165903 A1    Jun. 14, 2018

(30) Foreign Application Priority Data
Jun. 1, 2015  (KR) .......................... 10-2015-0077502

(51) Int. Cl.
*G07C 9/00* (2006.01)
*E05B 19/00* (2006.01)
*B60R 25/24* (2013.01)

(52) U.S. Cl.
CPC .......... *G07C 9/00944* (2013.01); *B60R 25/24* (2013.01); *E05B 19/0082* (2013.01);
(Continued)

(58) Field of Classification Search
CPC ...... G07C 9/00944; G07C 2009/00976; G07C 2009/00952; E05B 19/0082; E05B 19/00; B60R 25/24; B60R 25/10; G06K 17/00
See application file for complete search history.

(56) References Cited

U.S. PATENT DOCUMENTS

2012/0012659 A1 *  1/2012  Sugimoto ............. E05B 19/046
235/492

FOREIGN PATENT DOCUMENTS

JP     03110199 A  *  5/1991
JP     2659440 B2     6/1997
(Continued)

OTHER PUBLICATIONS

Eun-Ji Oh, "Restructuring of epoxy resin market, traditional materials industry also moving to Asia", The Electronic Times, Oct. 22, 2013.
(Continued)

*Primary Examiner* — Sonji N Johnson
(74) *Attorney, Agent, or Firm* — LRK Patent Law Firm

(57) ABSTRACT

A card-type smart key includes: a PCB substrate on which components are mounted; and an EMC case which is coupled to the component mounting surface of the PCB substrate, wherein the EMC case is formed by: fixing the component non-mounting surface of the PCB substrate onto a lower plate of a mold after bringing the component non-mounting surface into close contact with the lower plate; covering the component mounting surface of the PCB (Continued)

substrate with an upper plate of the mold, leaving a preset space; and inputting a molding material into the preset space.

6 Claims, 11 Drawing Sheets

(52) U.S. Cl.
CPC .............. *G07C 2009/00952* (2013.01); *G07C 2009/00976* (2013.01)

(56) References Cited

FOREIGN PATENT DOCUMENTS

| JP | 2003-236894 A | | 8/2003 | |
| JP | 2003236894 A | * | 8/2003 | |
| JP | 2010-177981 A | | 8/2010 | |
| JP | 2010177981 A | * | 8/2010 | |
| JP | 2010-229628 A | | 10/2010 | |
| JP | 2010229628 A | * | 10/2010 | .......... E05B 19/046 |
| KR | 10-2012-0033564 A | | 4/2012 | |
| KR | 20120033564 A | * | 4/2012 | |
| KR | 10-2013-0077854 A | | 7/2013 | |

OTHER PUBLICATIONS

KIPO Office Action for Korean Application No. 10-2015-0077502 dated Dec. 20, 2016 which corresponds to the above-referenced U.S. application.

Search Report, dated Sep. 1, 2016, for International Application No. PCT/KR2016/005795.

Written Opinion, dated Sep. 1, 2016, for International Application No. PCT/KR2016/005795.

* cited by examiner

CARD-TYPE SMART KEY AND MANUFACTURING METHOD THEREFOR

CROSS-REFERENCE TO RELATED APPLICATIONS

The present application is a U.S. National Phase entry from International Application No. PCT/KR2016/005795, filed Jun. 1, 2016, which claims priority to Korean Patent Application No. 10-2015-0077502, filed Jun. 1, 2015, the disclosure of which is incorporated by reference herein in its entirety.

BACKGROUND OF THE INVENTION

1. Technical Field

The present invention relates to a card type smart key including a PCB substrate on which a part is mounted and an EMC case coupled to the part mounting surface of the PCB substrate, wherein the EMC case closely fixes the part non-mounting surface of the PCB substrate to the lower plate of a mold, the upper plate of the mold covers the part mounting surface of the PCB substrate with a predetermined space interposed between the upper plate of the mold and the part mounting surface, and a forming material is injected into the predetermined space.

2. Description of Related Art

A vehicle that has been a necessity in modern life essentially includes a vehicle key that enables only a person having a right to the vehicle to drive the vehicle. The vehicle key has maintained its shape for a long time after it took the form of a metal stick key like opening the door of a house, and has an ignition key and door key united into one. Recently, a vehicle key capable of a remocon function is widely used.

However, a vehicle remocon key including such a bundle of keys has disadvantage in that an external appearance is poor because the remote key makes a suit pocket, etc. bulged and the protruding part of the remocon key makes a user inconvenient. Accordingly, a card type smart key of a thin thickness is recently developed.

The card type smart key has advantages in that it has a thin thickness (about 3~10 mm) and it can be kept in a wallet, a mobile phone patch, etc. Unlike in a common remocon, although the smart key is drawn out from a pocket and a button is not pressed, an antenna embedded in a vehicle detects a signal generated from the smart key and automatically releases the door locking device of the vehicle.

If a conventional card type smart key is fabricated, however, a method of flying a PCB substrate having a smart function between the upper plate and lower plate of a mold (levitational type), fixing them, and then performing forming by inputting a material was used. In this case, for the implementation of the forming of the PCB substrate and the internal shape, a process of fixing the PCB substrate to the mold is necessary. In order to prevent the deformation of the PCB substrate and the forming material, fixing pins were disposed in both the upper plate and lower plate of the mold.

Accordingly, when a conventional PCB substrate is formed, processing is performed in the state in which all of mold split lines remain in both the front and rear of an external appearance by the fixing pins. Accordingly, there are problems in that a cover for hiding the mold shape exposed in the external appearance is essentially necessary, the number of parts increases due to a limit to a change in the external appearance because the split lines are determined depending on a mold fixed shape, and a mold development cost is increased and mass-production machinability is deteriorated because a mold structure becomes complicated.

SUMMARY OF THE INVENTION

The present invention has been made to solve the above problems occurring in the prior art and an object of the present invention is to provide a card type smart key, wherein one side of a PCB substrate is closely pushed and fixed thereto a mold and EMC forming is performed through the other side so that an external appearance exposed as a mold structure appears on one side only.

Furthermore, an object of the present invention is to provide a card type smart key, wherein when a PCB substrate is fixed to a mold, a plurality of fixing pins is formed only in the lower plate of the mold and the PCB substrate and the lower plate of the mold are closely pushed and fixed so that an external appearance exposed as a mold structure after the molding appears on one side only.

Furthermore, an object of the present invention is to provide a card type smart key, wherein a separate space is provided in the part non-mounting surface of a PCB substrate so that even after an EMC case is formed in the PCB substrate, the EMC case can be electrically connected to the parts of the PCB substrate or the mounting of an additional part or a part performance test for the PCB substrate is possible.

A card type smart key according to an embodiment of the present invention for achieving the above objects includes a card type smart key including a PCB substrate on which a part is mounted and an EMC case coupled to the part mounting surface of the PCB substrate, wherein the EMC case is formed by closely fixing the part non-mounting surface of the PCB substrate to the mold lower plate of a mold, covering the part mounting surface of the PCB substrate with the upper plate of the mold with a predetermined space interposed therebetween, and injecting a forming material into the predetermined space. In this case, the forming material is an epoxy molding compound (EMC).

In this case, in the card type smart key according to an embodiment of the present invention, the PCB substrate is closely fixed to the lower plate of the mold using a plurality of fixing pins formed in the lower plate of the mold, and the EMC case is formed.

Furthermore, in the card type smart key according to an embodiment of the present invention, a plurality of holes is formed in the part non-mounting surface, and the PCB substrate is electrically connected to the part of the PCB substrate or enables an additional part to be mounted thereon. The PCB substrate enables a part performance test for the PCB substrate through the plurality of holes of the part non-mounting surface.

Moreover, the card type smart key according to an embodiment of the present invention may further include a deco cover covering and protecting the part non-mounting surface of the PCB substrate in which the EMC case has been formed, and may further include an emblem indicating a brand of the card type smart key.

Furthermore, the card type smart key according to an embodiment of the present invention may further include a mecha key. The mecha key is coupled to a mecha key hole generated by forming the EMC case after a mecha key hole slider is coupled to the PCB substrate. The card type smart key may further include a leaf spring supporting the entry and exit of the mecha key.

Furthermore, the card type smart key according to an embodiment of the present invention may further include a battery and a battery cover having a hook structure to facilitate a replacement of the battery. The battery is coupled to a battery hole generated by forming the EMC case after a battery hole slider is coupled to the PCB substrate.

Meanwhile, a method of manufacturing a card type smart key according to an embodiment of the present invention includes the steps of (a) closely fixing the part non-mounting surface of a PCB substrate on which a part has been mounted to the lower plate of a mold, (b) covering the part mounting surface of the PCB substrate with the upper plate of the mold with a predetermined space interposed therebetween, (c) forming an EMC case by injecting a forming material into the predetermined space, and (d) extracting the EMC case after hardening.

Furthermore, in the method of manufacturing a card type smart key according to an embodiment of the present invention, in the step (a), the PCB substrate is fixed using a plurality of fixing pins formed in the lower plate of the mold.

Moreover, in the method of manufacturing a card type smart key according to an embodiment of the present invention, in the step (a), a mecha key hole slider or a battery hole slider is coupled to the PCB substrate. In the step (a), the mecha key hole slider or the battery hole slider is engaged with a latch stick of the lower plate of the mold to fix the PCB substrate.

Advantageous Effects

The card type smart key of the present invention can improve the development cost and mass-production machinability of a smart key because a mold structure can be made slim. Furthermore, the marketability of an external appearance can be enhanced by removing mold split lines attributable to EMC forming in the electrical part mounting surface of the PCB substrate. An external appearance design and the degree of freedom in a method of construction can be improved. A function can be freely extended because an electrical part can be additionally mounted on the part non-mounting surface of the PCB substrate after EMC case processing.

Furthermore, after conventional forming, in a half-finished product, a mold fixed shape cannot be removed from the electrical part mounting surface of the PCB substrate. In contrast, in a half-finished product after forming in the present invention, the removal and change of the design for the external appearance of the PCB substrate are free. In this case, a mold fixed shape does not remain in the external appearance due to a difference in the PCB fixed structure. Furthermore, a structure whose defect attributable to the lift of a PCB substrate has been improved can be realized, and the rear design of a product not limited to a mold shape in an external appearance implementation is made possible.

DETAILED DESCRIPTION OF THE INVENTION

Hereinafter, a "card type smart key" according to the present invention is described in detail with reference to the accompanying drawings. Embodiments to be described hereunder are provided in order for those skilled in the art to easily understand the technological spirit of the present invention, and the present invention is not restricted by the embodiments. Furthermore, contents expressed in the accompanying drawings have been diagrammed to easily describe the embodiments of the present invention, and may be different from those that are actually implemented.

Meanwhile, elements to be described herein are only examples for implementing the embodiments of the present invention. Accordingly, in other implementations of the present invention, different elements may be used without departing from the spirit and range of protection of the present invention.

Furthermore, an expression that some elements are "included" is an expression of an "open type", and the expression simply denotes that the corresponding elements are present, but should not be construed as excluding additional elements.

Furthermore, expressions, such as "the first" and "the second", are used to only distinguish between a plurality of elements and do not limit the sequence or other characteristics of the elements.

Figure 1:
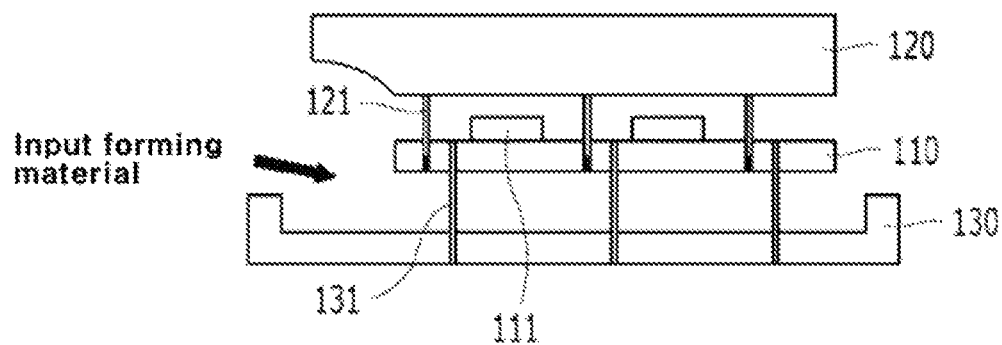
FIG. 1 is an exemplary diagram showing a construction in which the upper plate and lower plate of a mold are fixed using fixing pins in a process of forming a conventional card type smart key.
Figure 2:
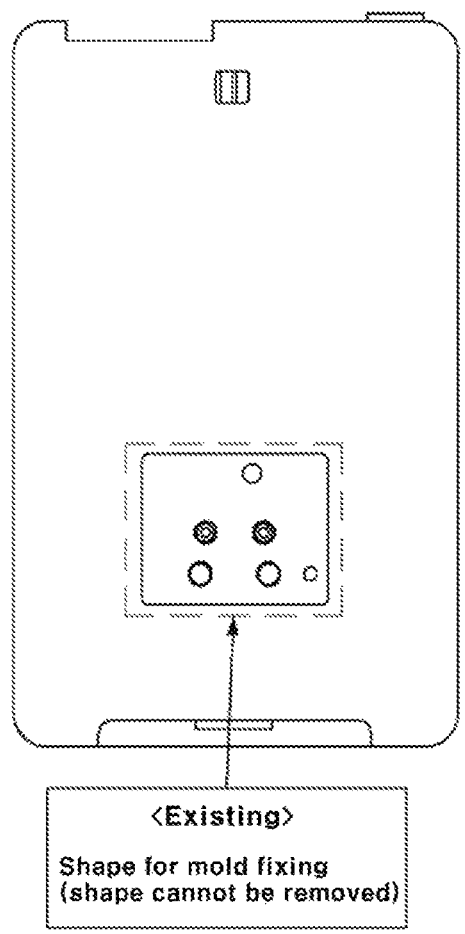
FIG. 2 is an exemplary diagram showing a shape from which the fixing pins are exposed after the conventional card type smart key is formed.

FIG. 1 is an exemplary diagram showing a construction in which the upper plate and lower plate of a mold are fixed using fixing pins in a process of forming a conventional card type smart key. FIG. 2 is an exemplary diagram showing a shape from which the fixing pins are exposed after the conventional card type smart key is formed.

Referring to FIG. 1, if a conventional card type smart key is fabricated, a PCB substrate 110 is flied between the upper plate 120 and lower plate 130 of a mold. If they are fixed, a levitational type fabrication method of fixing the PCB substrate 110, the upper plate 120 and the lower plate 130 using a plurality of fixing pins 121 formed in the upper plate 120 of the mold and a plurality of fixing pins 131 formed in the lower plate 130 of the mold was used.

In this case, the shapes (refer to FIG. 2) of all the fixing pins are exposed in the front and rear of an external casing formed to cover the PCB substrate by inputting a forming material. There are problems in that the aesthetic impression and visibility of the card type smart key itself are deteriorated because a cover for hiding the trace of the fixing pins is essentially required.

Figure 3:
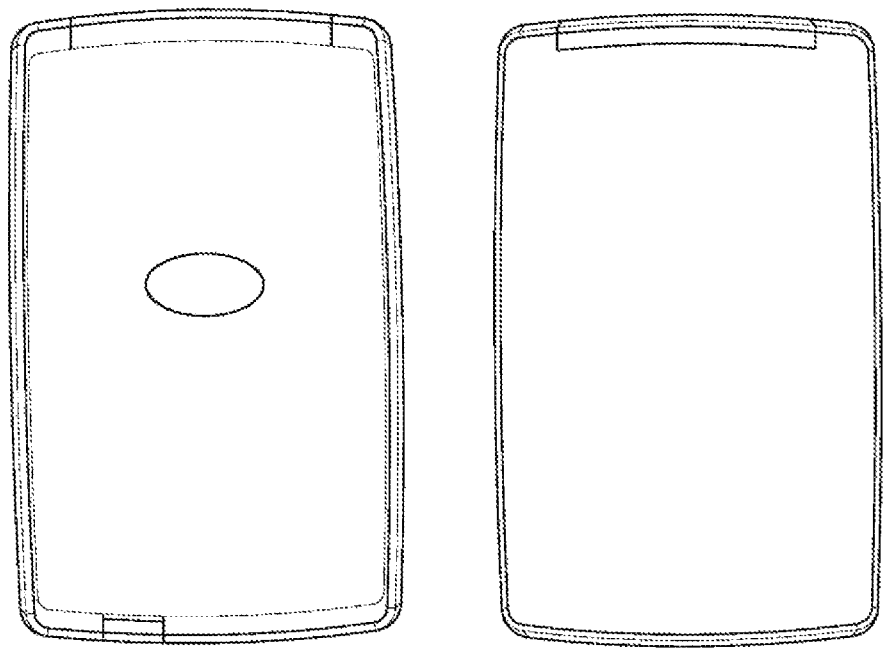
FIG. 3 is an exemplary diagram showing the construction of a card type smart key according to an embodiment of the present invention.
Figure 4A:
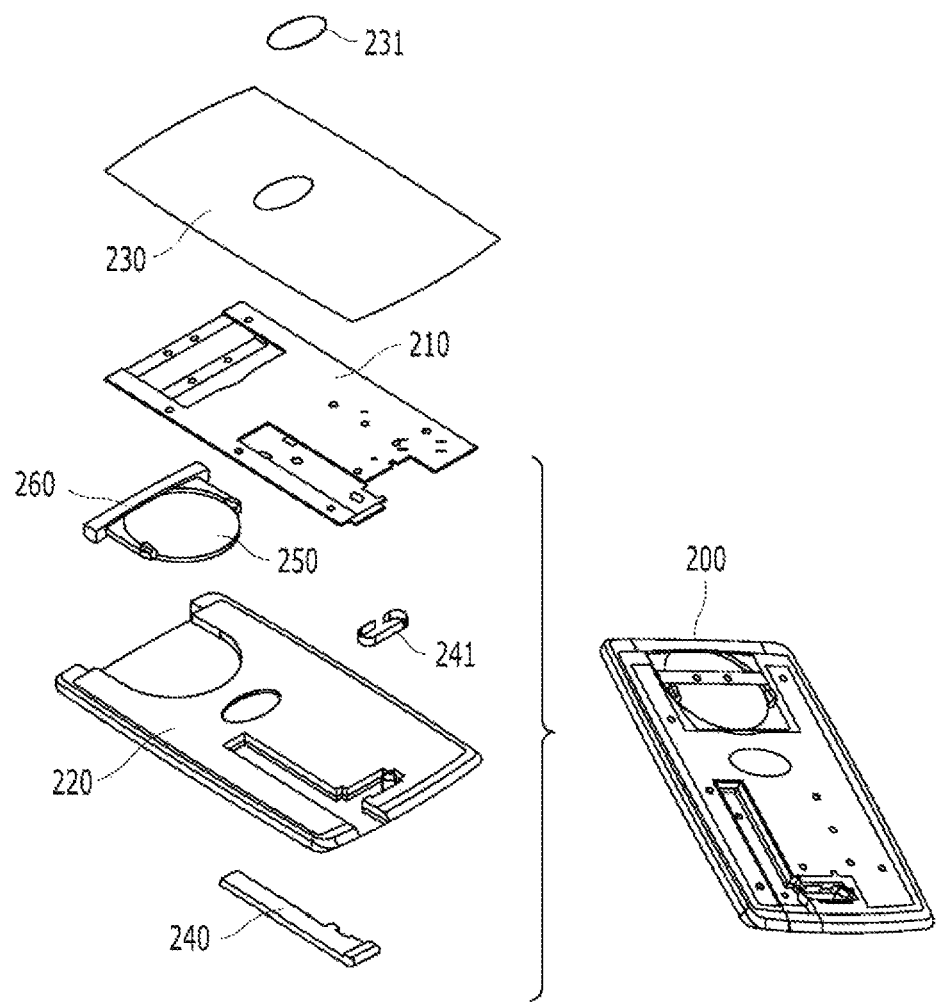
FIGS. 4a and 4b are exemplary diagrams showing components included in the card type smart key according to an embodiment of the present invention.
Figure 4B:
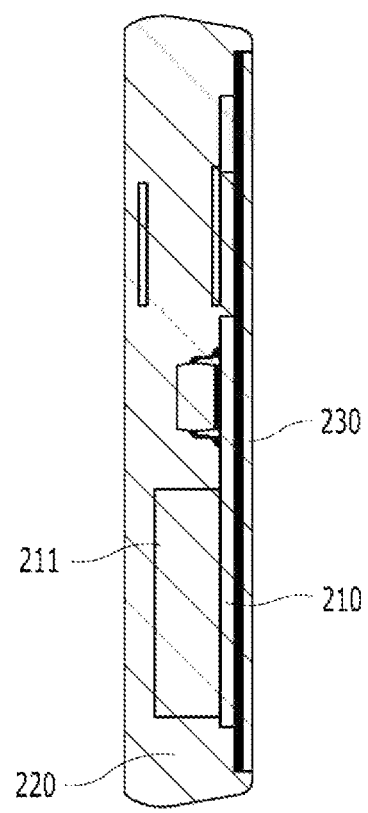

FIG. 3 is an exemplary diagram showing the construction of a card type smart key according to an embodiment of the present invention. FIGS. 4a and 4b are exemplary diagrams showing components included in the card type smart key according to an embodiment of the present invention.

Referring to FIGS. 3, 4a and 4b, the card type smart key 200 according to an embodiment of the present invention may include a PCB substrate 210, an EMC case 220, a deco cover 230, an emblem 231, a mecha key 240, a leaf spring 241, a battery 250 and a battery cover 260.

The PCB substrate 210 is a plate on which a part is mounted and in which electrical circuits capable of changing wiring have been formed, and may include all of prints, wiring plates and insulating substrates made of an insulating material capable of forming a conductive pattern on a surface of the insulating substrate. An enhanced PCB substrate, a strength PCB substrate and a heat-resistant PCB substrate may be applied to the PCB substrate.

The EMC case 220 is coupled to the part mounting surface of the PCB substrate 210. In this case, the EMC case 220 closely fixes the part non-mounting surface of the PCB substrate to the lower plate of the mold and covers the part mounting surface of the PCB substrate with the upper plate of the mold with a predetermined space interposed therebetween so that a forming material is put into the predetermined space. In this case, as in FIG. 4b, the forming material is put into the surface of the PCB substrate 210 on which the part 211 is mounted to form the EMC case 220, and the lower plate of the mold is closely fixed to the non-mounting surface through fixing pins.

The deco cover 230 protects the part non-mounting surface of the PCB substrate in which the EMC case has been formed, and may further include the emblem 231 for indicating the brand of the card type smart key in the deco cover 230.

In the mecha key 240, a mecha key hole slider is coupled to the PCB substrate and coupled to a mecha key hole generated by forming the EMC case. The mecha key 240 may further include the leaf spring 241 supporting the entry and exit of the mecha key. The mecha key is a part of a vehicle, that is, a kind of emergency key, and is an emergency part to be used when vehicle door locking release is impossible due to the discharge or malfunction of the smart key. In this case, an emergency ignition function in addition to mechanical test release may be performed by a separate FOB (=CARDKEY) and the IMMO communication function of an engine start button.

The battery 250 may be configured to be separately replaced after the entire card type smart key is assembled, and may further include the battery cover 260 having a hook structure so that the battery can be easily replaced. In this case, the battery hole slider of the battery 250 is coupled to the PCB substrate and coupled to a battery hole generated by forming the EMC case.

Figure 5:
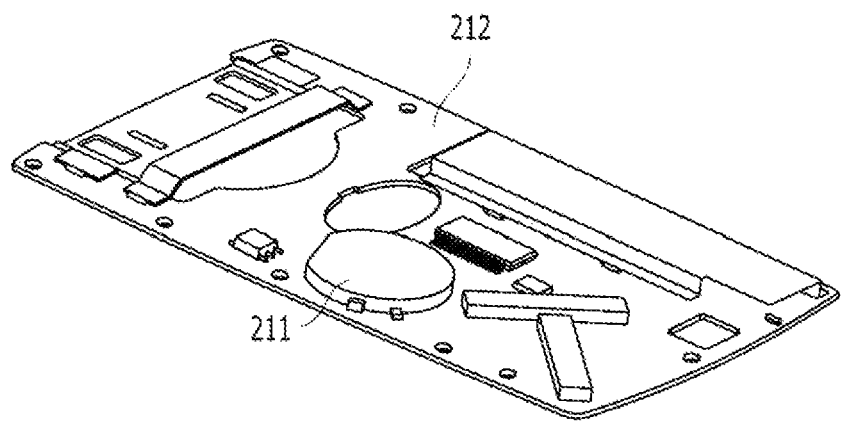
FIG. 5 is a component diagram showing the part mounting surface of a PCB substrate in the card type smart key according to an embodiment of the present invention.
Figure 6:
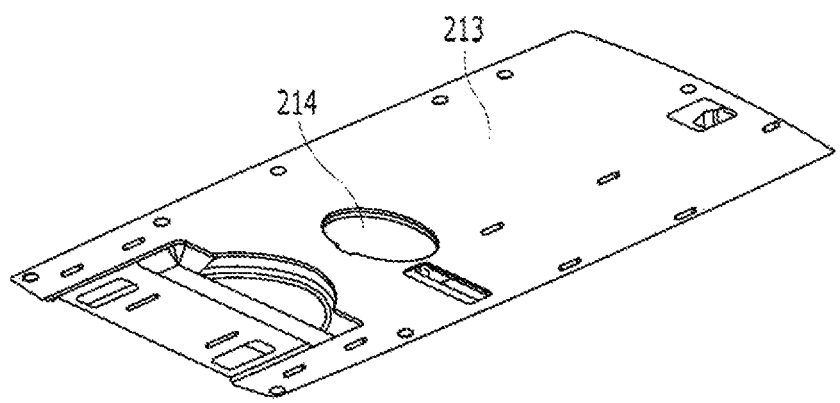
FIG. 6 is a component diagram showing the part non-mounting surface of the PCB substrate in the card type smart key according to an embodiment of the present invention.
Figure 7:
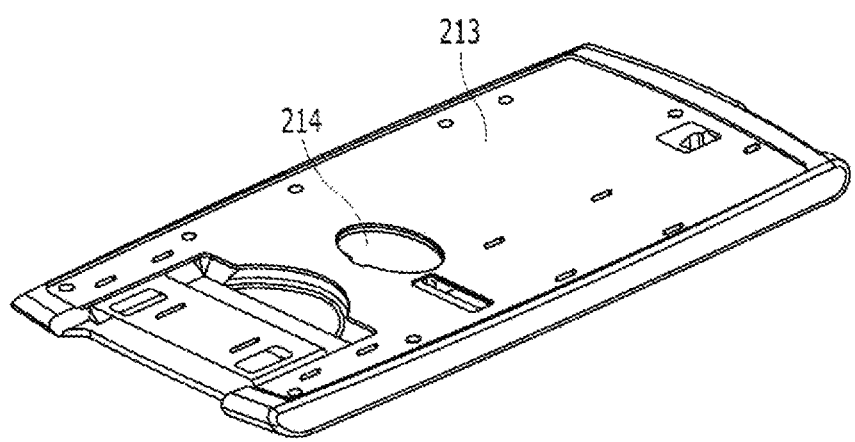
FIG. 7 is a component diagram showing that a plurality of holes is formed in the part non-mounting surface of the PCB substrate in the card type smart key according to an embodiment of the present invention.

FIG. 5 is a component diagram showing the part mounting surface of the PCB substrate in the card type smart key according to an embodiment of the present invention. FIG. 6 is a component diagram showing the part non-mounting surface of the PCB substrate in the card type smart key according to an embodiment of the present invention. FIG. 7 is a component diagram showing that a plurality of holes is formed in the part non-mounting surface of the PCB substrate in the card type smart key according to an embodiment of the present invention.

The PCB substrate 210 may be divided into the part mounting surface 212 on which the part 211 is mounted and the part non-mounting surface 213. In this case, a plurality of holes 214 is formed in the part non-mounting surface 213 so that the PCB substrate is electrically connected to the part of the PCB substrate or an additional part is mounted on the PCB substrate. Accordingly, the function of a product can be extended. Furthermore, a part performance test for the PCB substrate may be made possible through the plurality of holes of the part non-mounting surface.

Meanwhile, the mounting surface of the PCB substrate has a complete external appearance not having a mold split shape after EMC forming, and enables an external appearance implementation through various methods, such as embossing, painting, filming and printing, if necessary. Furthermore, the external appearance of the non-mounting surface of the PCB substrate may be finished using at least one material of a mold, a film, a metal plate, tempered glass and silicon.

Figure 8:
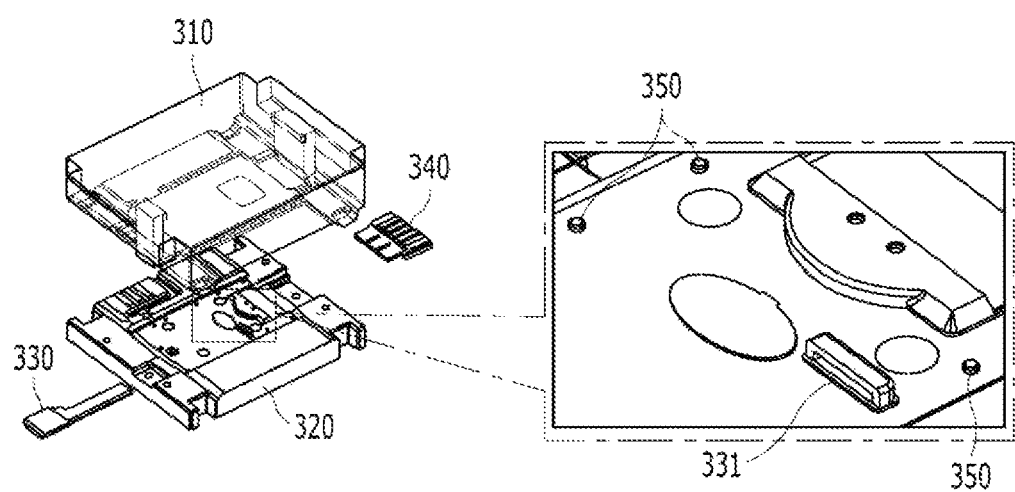
FIG. 8 is an exemplary diagram showing a construction in which the card type smart key according to an embodiment of the present invention is fabricated using the upper plate and lower plate of the mold.
Figure 9:
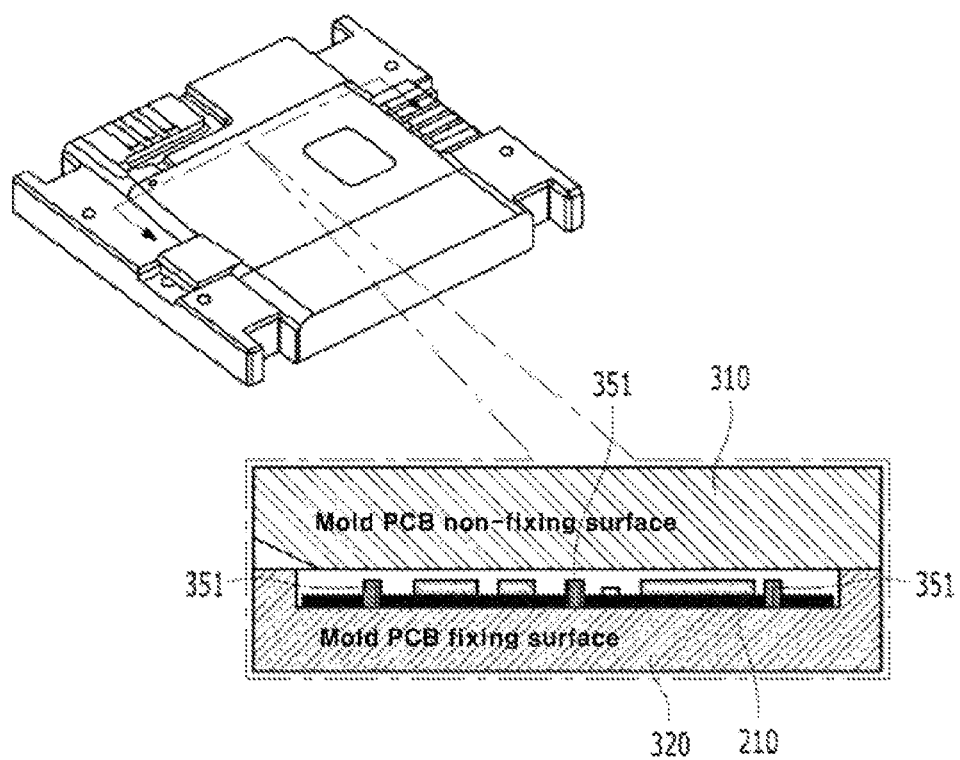
FIG. 9 is a component diagram showing that the card type smart key according to an embodiment of the present invention is fixed using the fixing pins formed in the lower plate of the mold.
Figure 10:
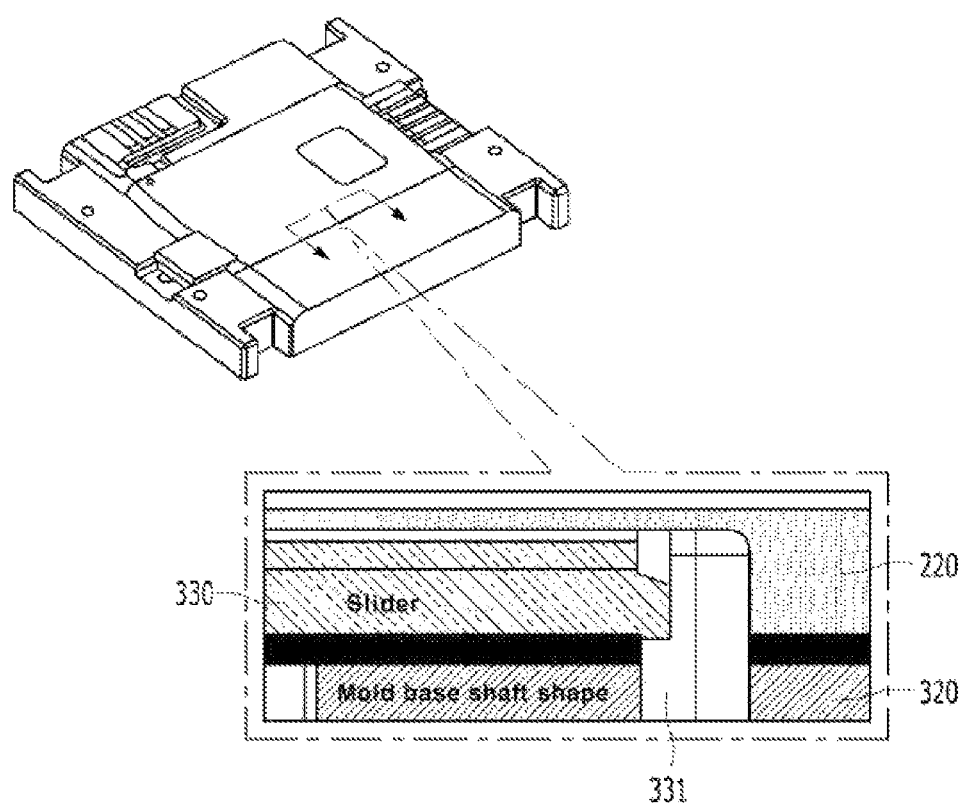
FIG. 10 is an exemplary diagram showing a construction in which the hole slider of the card type smart key according to an embodiment of the present invention is engaged and combined with the latch stick of the lower plate of the mold.

FIG. 8 is an exemplary diagram showing a construction in which the card type smart key according to an embodiment of the present invention is fabricated using the upper plate and lower plate of the mold. FIG. 9 is a component diagram showing that the card type smart key according to an embodiment of the present invention is fixed using the fixing pins formed in the lower plate of the mold. FIG. 10 is an exemplary diagram showing a construction in which the hole slider of the card type smart key according to an embodiment of the present invention is engaged and combined with the latch stick of the lower plate of the mold.

A PCB fixed structure may be disposed in the lower plate 310 of a mold to improve the adhesion of the PCB substrate. First, the adhesion of the PCB substrate with the lower plate of the mold may be improved using a plurality of fixing pins 350. A slider latch stick structure may be formed in the lower plate of the mold to fix the mecha key hole slider 330 or battery hole slider 340 of the PCB substrate to the PCB substrate.

If the PCB substrate is fixed to the lower plate of the mold using the plurality of fixing pins, the plurality of fixing pins may be formed in the lower plate of the mold, holes corresponding to the plurality of fixing pins may be previously perforated in the PCB substrate, and the PCB substrate may be put into the fixing pins so that it does not move left or right (the X, Y-axis direction of the PCB substrate 의) and temporarily fixed not to move by determining an initial location.

Furthermore, a latch stick 331 may be formed in the lower plate 320 of the mold, and the mecha key hole slider 330 or the battery hole slider 340 may be engaged with the latch stick 331 of the lower plate of the mold to fix the top and bottom (the Z-axis direction of the PCB substrate) of the PCB substrate. Accordingly, upon molding the EMC case, a PCB substrate lift attributable to the hydraulic pressure of the forming material can be prevented, and non-forming and a defective external appearance attributable to the PCB substrate lift can be reduced. In this case, the location of the slider latch stick may be best computed by taking into consideration all of the shapes and forming hydraulic pressure of the mecha key hole slider and the battery hole slider on both sides and the PCB substrate, and the slider latch stick may be formed in the lower plate of the mold.

Figure 11:
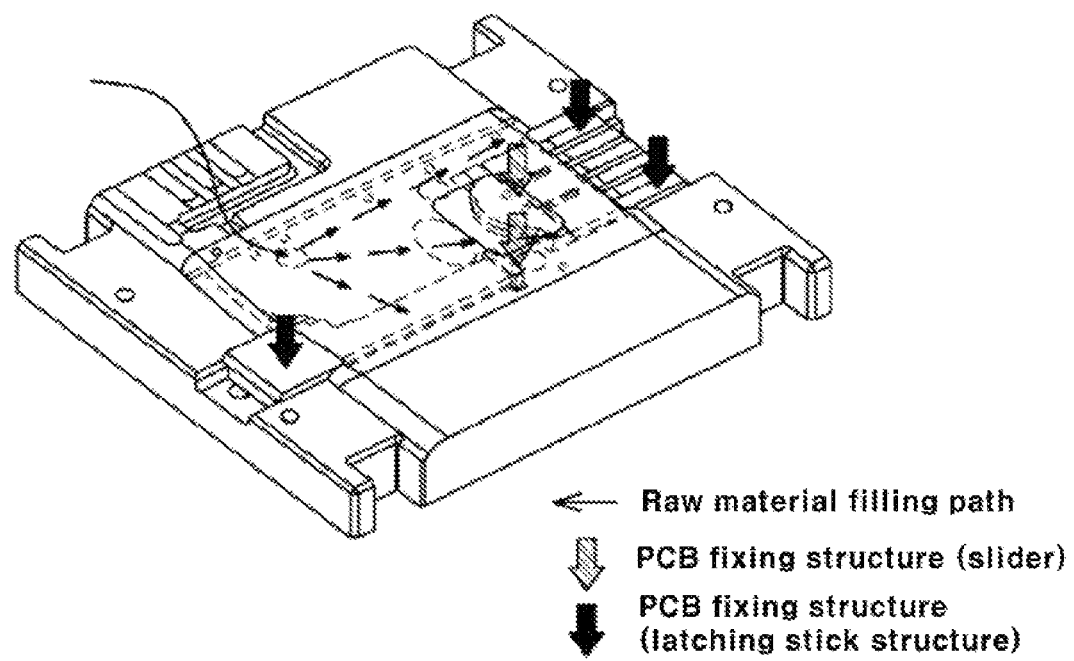
FIG. 11 is a component diagram showing the direction in which the EMC case of the card type smart key according to an embodiment of the present invention is formed.

FIG. 11 is a component diagram showing the direction in which the EMC case of the card type smart key according to an embodiment of the present invention is formed.

Referring to FIG. 11, the part non-mounting surface of a PCB substrate 210 is closely fixed to the lower plate 320 of the mold, the part mounting surface of the PCB substrate is covered with the upper plate 310 of the mold with the predetermined space interposed therebetween so that the forming material is injected into the predetermined space. As indicated by arrows in FIG. 11, the predetermined space may be filled with the raw material.

In this case, the forming material preferably includes an epoxy molding compound (EMC). The EMC is a plastic material for protecting chips and circuits within a semiconductor against various external environments, such as moisture, an impact and oxidization. The EMC is fabricated by mixing silica and some additives with epoxy resin, and can realize high productivity and safety and a reduction of a manufacturing cost.

Figure 12:
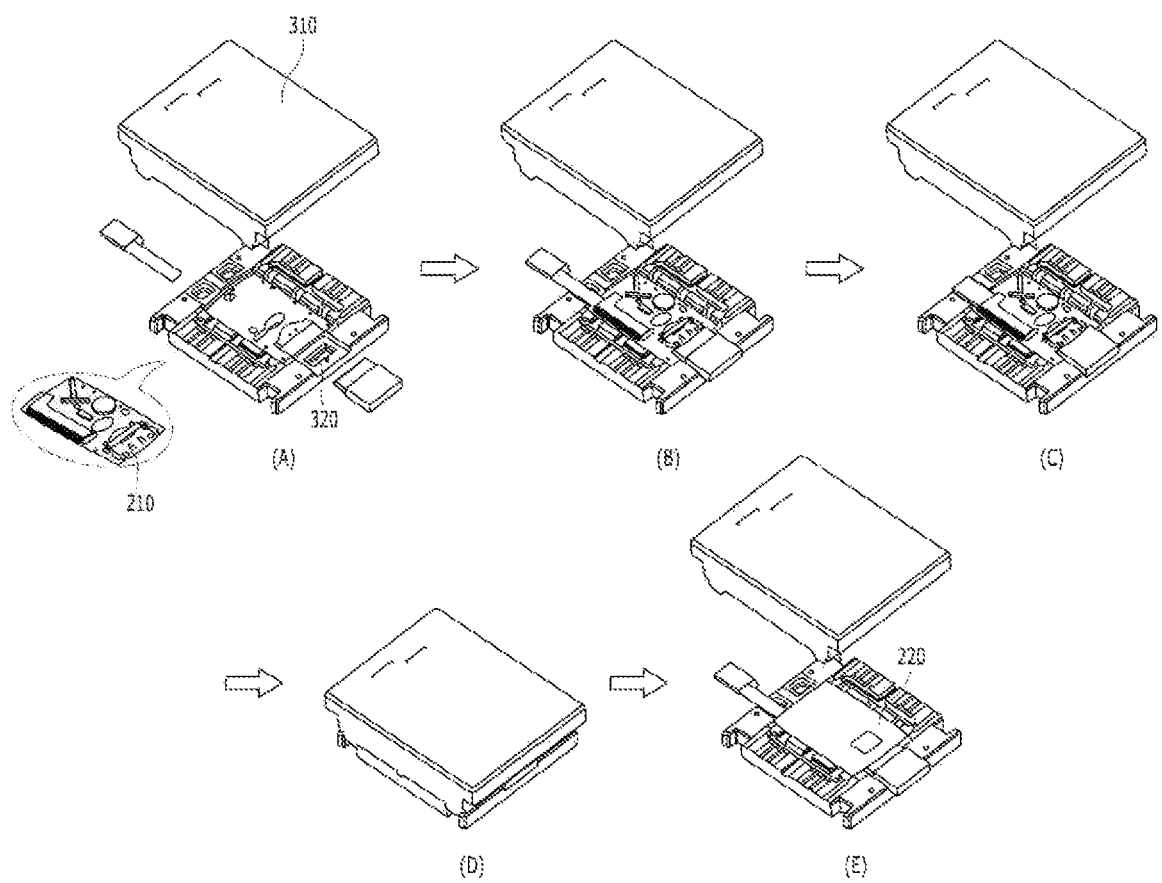
FIG. 12 is an exemplary diagram showing a method of manufacturing a card type smart key according to an embodiment of the present invention.

FIG. 12 is an exemplary diagram showing a method of manufacturing the card type smart key according to an embodiment of the present invention.

Referring to FIG. 12, the method of manufacturing the card type smart key according to the present invention may include the steps of (a) closely fixing the part non-mounting surface of the PCB substrate 210 on which a part has been mounted to the lower plate 320 of the mold, (b) covering the part mounting surface of the PCB substrate with the upper plate 330 of the mold with a predetermined space interposed therebetween, (c) forming the EMC case 220 by injecting the forming material into the predetermined space, and (d) extracting the EMC case after hardening.

In this case, in the step (a), the PCB substrate is fixed using the plurality of fixing pins formed in the lower plate of the mold. The mecha key hole slider or the battery hole slider may be coupled to the PCB substrate. The mecha key hole slider or the battery hole slider is engaged with the latch stick of the lower plate of the mold to fix the PCB substrate.

The aforementioned embodiments of the present invention have been disclosed for illustrative purposes, and the present invention is not restricted by the embodiments. Furthermore, those skilled in the art to which the present invention pertains may modify and change the present invention in various ways within the spirit and range of the present invention, and such modifications and changes should be construed as belonging to the scope of the present invention.

| Description of Reference Numerals | |
|---|---|
| 110: conventional PCB substrate | 111: conventional PCB substrate part |
| 120: conventional mold upper plate | 121: conventional mold upper plate fixing pin |
| 130: conventional mold lower plate | 131: conventional mold lower plate fixing pin |
| 200: card type smart key | 210: PCB substrate |
| 211: PCB substrate part | 212: part mounting surface of PCB substrate |
| 213: part non-mounting surface of PCB substrate | 214: plurality of holes |
| 220: EMC case | 230: deco cover |
| 231: emblem | 240: mecha key |
| 241: leaf spring | 250: battery |
| 260: battery cover | |
| 310: mold upper plate | 320: mold lower plate |
| 330: mecha key hole slider | 331: slider latch stick |
| 340: battery hole slider | 350, 351: plurality of fixing pins |

The invention claimed is:

1. A method of manufacturing a card type smart key, the method comprising steps of: (a) closely fixing a part non-mounting surface of a printed circuit board PCB substrate to a lower plate of a mold, wherein the PCB substrate has parts mounted on a part mounting surface of the PCB substrate; (b) covering the part mounting surface of the PCB substrate with an upper plate of the mold with a predetermined space interposed between the part mounting surface and the upper plate; (c) forming an EMC epoxy molding compound case by injecting a forming material into the predetermined space; and (d) hardening and extracting the EMC case, wherein in the step (a): the part non-mounting surface of the PCB substrate is fixed to the lower plate of the mold using a plurality of fixing pins formed on the lower plate of the mold; a mechanical key hole slider or a battery hole slider is coupled to the PCB substrate, and the mechanical key hole slider or the battery hole slider is engaged with a latch stick formed on the lower plate of the mold, wherein the latch stick is formed to be protruded through a hole of the PCB substrate to fix the mechanical key hole slider or the battery hole slider to the PCB substrate.

2. The method of claim 1, wherein the PCB substrate has a plurality of holes formed in the part non-mounting surface so that the PCB substrate is electrically connected to the parts of the PCB substrate or an additional part is mounted on the PCB substrate.

3. The method of claim 2, wherein the PCB substrate allows a part performance test for the PCB substrate through the plurality of holes of the part non-mounting surface.

4. The method of claim 1, wherein the forming material includes an epoxy molding compound (EMC).

5. The method of claim 1, wherein a mechanical key is coupled to a mechanical key hole generated by forming the EMC case after the mechanical key hole slider is coupled to the PCB substrate.

6. The method of claim 1, wherein a battery is coupled to a battery hole generated by forming the EMC case after the battery hole slider is coupled to the PCB substrate.

* * * * *